United States Patent
Jenkins, Jr.

[19]

[11] Patent Number: 6,145,293

[45] Date of Patent: Nov. 14, 2000

[54] SAFETY SHACKLE

[76] Inventor: William O. Jenkins, Jr., 856 Foley St., Jackson, Miss. 39202

[21] Appl. No.: 09/286,845

[22] Filed: Apr. 6, 1999

Related U.S. Application Data

[60] Provisional application No. 60/080,865, Apr. 6, 1998.

[51] Int. Cl.$^7$ .................................................. F16G 15/06
[52] U.S. Cl. ...................................................... 59/86; 59/85
[58] Field of Search ................................. 59/86, 85, 78

[56] References Cited

U.S. PATENT DOCUMENTS

| | | | |
|---|---|---|---|
| 355,980 | 1/1887 | Dimon | 59/86 |
| 389,493 | 9/1888 | Baker | 59/86 |
| 2,774,213 | 12/1956 | Gantz | 59/86 |
| 3,986,602 | 10/1976 | Dretzke | 59/86 |

*Primary Examiner*—David Jones
*Attorney, Agent, or Firm*—Peter A. Borsari

[57] ABSTRACT

A safety shackle having a modified U-shaped design comprising first and second arms, first and second cusps, a first slot disposed between the first arm and the first cusp and a second slot disposed between the second arm and the second slot, and a working area disposed between the first and second cusps. A designated chain link is introduced with within one of the slots and is locked within the slot by orienting the contiguous chain links in a plane perpendicular to the designated chain link, thereby locking the chain link within the slot.

5 Claims, 1 Drawing Sheet

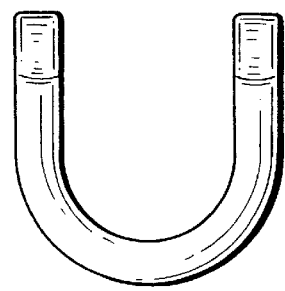
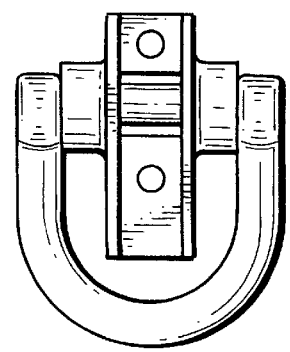
FIG. 1A  FIG. 1B
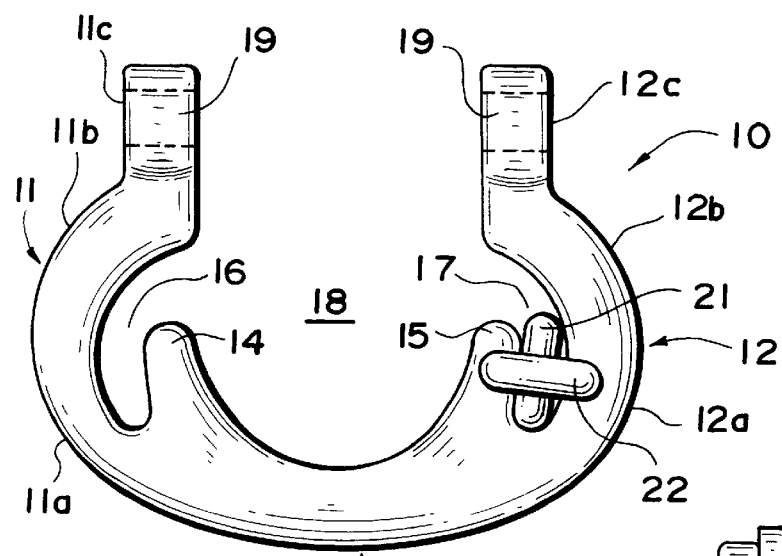
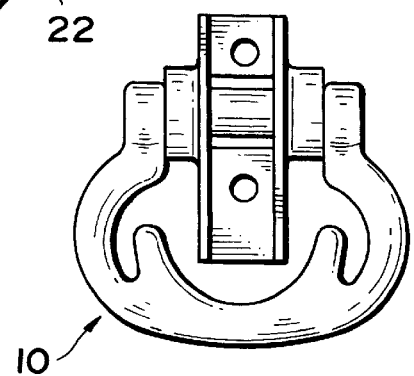
FIG. 2A
FIG. 2B

SAFETY SHACKLE

RELATED APPLICATIONS

This application claims priority from U.S. Provisional Application 60/080,865, filed Apr. 6, 1998.

FIELD OF INVENTION

The present invention relates to shackles comprising a substantially U-shaped clevis having aligned openings in each of its arms through which a closure or locking pin is introduced and more particularly relates to a safety shackle having a simple and unique locking arrangement for engaging and retaining a chain link. Specifically, the shackle of the present invention is provided with first and second arms, first and second cusps, a first slot disposed between the first arm and the first cusp and a second slot disposed between the second arm and the second slot, and a working area disposed between the first and second cusps. A designated chain link is introduced with within one of the slots and is locked within the slot by orienting the contiguous chain links in a plane perpendicular to the designated chain link, thereby locking the chain link within the slot.

BACKGROUND OF THE INVENTION

The prior art is replete with shackles and devises for securing ropes, chains and similar rigging components thereto. Efforts have been made to provide locking means for such shackles and have mostly concentrated on the locking pin as exemplified in U.S. Pat. Nos. 4,221,242 to Bruce, issued Sep. 9, 1980, 4,423,610 to Hart et al. issued Jan. 3, 1984 and 5,114,260 to Hart et al, issued May 19, 1992. Clevis devices also have been utilized to join chains. For example, in U.S. Pat. No. 2,774,213 to Gantz, issued Dec. 18, 1956, a chain fastener is disclosed consisting of a shackle and an end link, wherein the shackle is formed to interlock with the link when the latter is operatively positioned. In U.S. Pat. No. 3,986,602 to Dretzke, issued Oct. 19, 1976, a chain assembly is provided comprising a drive ink resembling the letter "M", having hook portions 11 extending from each end of the body of the link and curving transversely towards the body center.

Despite the efforts of the prior art, a need still exists for a safety shackle for tactical as well as civilian use which will prevent the chain clasp from slipping or breaking, thereby causing the chain to unreel through the shackle. Such a device should be easy to use and provide a simple locking of a designated link. Moreover, such as safety shackle should be capable of quick and easy reeling and unreeling of the chain. In addition, such a safety shackle should be adaptable to conventional chain riggings and be economical to manufacture.

SUMMARY OF THE INVENTION

Accordingly, it is an object of the present invention to provide a safety shackle which provides a simple yet dependable locking arrangement to prevent a chain clasp from slipping or breaking, thereby causing the chain to unreel through the shackle.

It is another object of the present invention to provide a safety shackle which is easy to use and utilizes a simple locking of a designated link.

It is an additional object of the present invention to provide a safety shackle which is capable of quick and easy reeling and unreeling of the chain.

It is a further object of the present invention to provide a safety shackle which can be used with conventional chain riggings.

It is still another object of the present invention to provide a safety shackle which is composed of durable material and economical to manufacture.

Additional objects, advantages and novel features of the invention will be set forth in part of the description which follows, and in part will become apparent to those skilled in the art upon examination of the following specification or may be learned by practice of the invention.

BRIEF DESCRIPTION OF THE DRAWINGS

The present invention will be better understood with reference to the appended drawing sheets, wherein:

FIG. 1A shows a front view of a conventional safety shackle.

FIG. 1B shows a front view of a conventional safety shackle connected to a shackle mount.

FIG. 2A shows a front view of the safety shackle of the present invention.

FIG. 2B shows a front view of the safety shackle of the present invention connection to a shackle mount.

DETAILED DESCRIPTION

The present invention relates to a modified U-shaped safety shackle 10 having a pair of arms 11 and 12 joined by base portion 13, a pair of cusps 14 and 15, a pair of slots 16 and 17 and a working area 18. Referring to FIG. 2A, the safety shackle 10 comprises a first arm 11 having a lower portion 11a extending upwardly from said base portion, a mid-portion 11b curving inwardly toward the center of the shackle and an upper portion 11c extending upwardly from said mid portion 11b and a second leg 12 also having a lower portion 12a extending upwardly from said base portion, a mid-portion 12b curving inwardly toward the center of the shackle and an upper portion 12c extending upwardly from said mid portion 12b. Cusps 14 and 15 are disposed between said arms 11 and 12 and extend upwardly to define slots 16 and 17. More specifically, cusp 14 extends upwardly upwardly towards the mid-portion 11b of arm 11 such that slot 16 is formed between arm 11 and cusp 13 and cusp 15 extends upwardly towards the mid-portion 12b of arm 12 such that slot 17 is formed between arm 12 and cusp 15. The area between the two cusps and between the upper portions 11c and 12c of arms 11 and 12 is defined as working area 18. The upper portions 11c and 12c are provided with eyes 19 for receiving a lock pin, as shown in FIG. 2B.

The safety shackle of the present invention is designed to provide a simple locking arrangement to selectively lock a designated chain link from a chain rigging on a shackle mount. In particular, as shown in FIG. 2A, a designated chain link 21 is inserted within slot 17 and the chain links 22 contiguous to the designated chain link 21 are oriented perpendicular thereto, thereby functioning as a locking mechanism thereby preventing the chain from unreeling through the safety shackle 10 without first lifting the chain links 21 and 22 up and over the cusp 15 and into the working area 18. Although in FIG. 2A the chain is locked within slot 17, it is to be understood that the chain alternatively can be locked within slot 16.

The shafts of each of the cusps 14 and 15 are designed to be larger in diameter than the inside diameter of the chain links 22 and 23 such that the chain link(s) cannot be inserted and locked onto the cusp shaft as the chain is being introduced or removed from the slot.

While particular embodiments of the invention have been described, it will be understood, of course, that the invention is not limited thereto, and that many obvious modifications and variations can be made, and that such modifications and variations are intended to fall within the scope of the appended claims.

What is claimed is:

1. A safety shackle comprising a first arm and a second arm, a base portion joining said first arm and said second arm, a first cusp and a second cusp, a first slot and a second slot and a working area, said first arm having a lower portion extending upwardly from said base portion, a mid-portion curving inwardly toward said working area, and an upper portion extending upwardly from said mid-portion, said first cusp extending upwardly towards said mid-portion of said first arm in such a manner that said first slot is formed between said first arm and said first cusp, said second arm having a lower portion extending upwardly from said base portion, a mid-portion curving inwardly toward said working area, and an upper portion extending upwardly from said mid-portion, said second cusp extending upwardly towards said mid-portion of said second arm in such a manner that said second slot is formed between said second arm and said second cusp, said working area being formed by the area between said first and second cusps and the upper portions of said first and second arms, each of said first and second slots being configured in such a manner that a chain link can be introduced within one of said first and second slots.

2. A safety shackle in accordance with claim 1, wherein a chain is locked within said safety shackle by introducing a first chain link lying in a plane within one of said first or second slots and locking said first chain link within said one of first or second slots by orienting each of the chain links contiguous to said first chain link in a plane perpendicular to the plane of said first chain link, thereby locking said first chain link within one of said first or second slots.

3. The safety shackle in accordance with claim 1, wherein each of said first and second cusps has a first diameter, said first chain link and said chain links contiguous to said first chain link have a second diameter, said second diameter being less than said first diameter.

4. A safety shackle capable of locking a chain therein, comprising a first arm and a second arm, a base portion joining said first arm and said second arm, a first cusp and a second cusp, a first slot and a second slot and a working area, said first arm having a lower portion extending upwardly from said base portion, a mid-portion curving inwardly toward said working area, and an upper portion extending upwardly from said mid-portion, said first cusp extending upwardly towards said mid-portion of said first arm in such a manner that said first slot is formed between said first arm and said first cusp, said second arm having a lower portion extending upwardly from said base portion, a mid-portion curving inwardly toward said working area, and an upper portion extending upwardly from said mid-portion, said second cusp extending upwardly towards said mid-portion of said second arm in such a manner that said second slot is formed between said second arm and said second cusp, said working area being formed by the area between said first and second cusps and the upper portions of said first and second arms, each of said first and second slots being configured in such a manner that a chain link can be introduced within one of said first and second slots, wherein a chain is locked within said safety shackle by introducing a first chain link lying in a plane within one of said first or second slots and locking said first chain link within said one of first or second slots by orienting each of the chain links contiguous to said first chain link in a plane perpendicular to the plane of said first chain link, thereby locking said first chain link within one of said first or second slots.

5. The safety shackle in accordance with claim 4, wherein each of said first and second cusps has a first diameter, said first chain link and said chain links contiguous to said first chain link have a second diameter, said second diameter being less than said first diameter.

\* \* \* \* \*